(12) United States Patent
Frazier et al.

(10) Patent No.: US 9,949,461 B2
(45) Date of Patent: Apr. 24, 2018

(54) APPARATUS AND METHOD TO IDENTIFY MORBID ANIMALS

(71) Applicant: Trax Right, LLC, Canyon, TX (US)

(72) Inventors: John P. Frazier, Portland, ME (US);
Peter J. Kuzma, Philadelphia, PA (US);
Stephen E. Bachman, Canyon, TX (US)

(73) Assignee: TRAX RIGHT, LLC, Canyon, TX (US)

( * ) Notice: Subject to any disclaimer, the term of this patent is extended or adjusted under 35 U.S.C. 154(b) by 45 days.

(21) Appl. No.: 14/731,091

(22) Filed: Jun. 4, 2015

(65) Prior Publication Data
US 2015/0351369 A1 Dec. 10, 2015

Related U.S. Application Data

(60) Provisional application No. 62/008,362, filed on Jun. 5, 2014.

(51) Int. Cl.
*G08B 23/00* (2006.01)
*A01K 29/00* (2006.01)
*A61D 17/00* (2006.01)

(52) U.S. Cl.
CPC ............ *A01K 29/005* (2013.01); *A61D 17/00* (2013.01)

(58) Field of Classification Search
CPC .............................. A01K 29/005; A61D 17/00
See application file for complete search history.

(56) References Cited

U.S. PATENT DOCUMENTS

| 5,793,813 A * | 8/1998 | Cleave | H04B 7/18567 342/352 |
| 6,113,539 A | 9/2000 | Ridenour | |
| 6,329,918 B1 * | 12/2001 | Moyer | A01K 11/00 119/859 |
| 6,598,800 B1 * | 7/2003 | Schmit | G06K 19/04 235/462.44 |
| 6,664,897 B2 | 12/2003 | Pape et al. | |
| 7,726,055 B2 | 6/2010 | Costantini | |

(Continued)

FOREIGN PATENT DOCUMENTS

| JP | 2002112354 | * 12/2002 |
| KR | 10-2010-0064152 A | 6/2010 |

(Continued)

OTHER PUBLICATIONS

International Search Report and Written Opinion dated Aug. 26, 2015 for International Application No. PCT/US2015/034257.

(Continued)

*Primary Examiner* — Quang D Pham
(74) *Attorney, Agent, or Firm* — Dale F. Regelman; Grossman, Tucker, Perreault & Pfleger, PLLC

(57) ABSTRACT

A method to identify morbid animals housed in a feedyard having a feed bunk, where the method includes providing a plurality of animal beacons and at least one beacon reader, placing the beacon reader adjacent the feed bunk, transmitting by a first animal beacon a first signal comprising a first unique identifier for a first animal wearing the first animal beacon, wherein the first animal is housed in the feedyard, receiving by the beacon reader the first signal, and based upon the first signal, determining a proximity of the first animal to the feed bunk.

10 Claims, 9 Drawing Sheets

(56) References Cited

U.S. PATENT DOCUMENTS

| | | | |
|---|---|---|---|
| 7,965,188 B2 | 6/2011 | Geissler | |
| 8,519,906 B2* | 8/2013 | Richards | H01Q 1/38 343/718 |
| 8,686,861 B2 | 4/2014 | Chung et al. | |
| 2002/0010390 A1* | 1/2002 | Guice | A01K 11/008 600/300 |
| 2003/0146284 A1* | 8/2003 | Schmit | G06K 19/04 235/462.44 |
| 2005/0145187 A1 | 7/2005 | Gray | |
| 2007/0008069 A1* | 1/2007 | Lastinger | G06K 7/0008 340/10.1 |
| 2007/0012260 A1 | 1/2007 | Boyd et al. | |
| 2007/0149216 A1* | 6/2007 | Misikangas | H04W 64/00 455/456.1 |
| 2008/0122696 A1* | 5/2008 | Huseth | G01S 5/0027 342/464 |
| 2008/0186132 A1* | 8/2008 | Ikeo | B60R 25/24 340/5.7 |
| 2008/0231421 A1* | 9/2008 | Tuttle | G06K 19/07749 340/10.1 |
| 2009/0286548 A1* | 11/2009 | Coronel | H04W 4/20 455/456.1 |
| 2010/0229435 A1* | 9/2010 | Diliscia | G09F 3/00 40/300 |
| 2011/0012775 A1* | 1/2011 | Richards | H01Q 1/38 342/146 |
| 2011/0148639 A1* | 6/2011 | Geissler | A01K 11/004 340/573.1 |
| 2011/0166793 A1* | 7/2011 | March | A01K 29/005 702/19 |
| 2012/0062381 A1* | 3/2012 | Liu | G01S 11/06 340/572.1 |
| 2013/0018761 A1* | 1/2013 | Kwak | G06Q 30/0201 705/26.61 |
| 2013/0340305 A1 | 12/2013 | Mobley | |
| 2014/0015945 A1* | 1/2014 | Bench | A01K 29/005 348/61 |
| 2015/0022321 A1* | 1/2015 | Lefevre | G06K 7/10079 340/10.1 |
| 2015/0375134 A1* | 12/2015 | Zhang | A63H 33/26 446/484 |
| 2016/0189514 A1* | 6/2016 | Todasco | G08B 21/02 340/8.1 |
| 2017/0055130 A1* | 2/2017 | LeBlanc | G01C 21/206 |

FOREIGN PATENT DOCUMENTS

| | | |
|---|---|---|
| KR | 10-1194690 B1 | 10/2012 |
| WO | 2013005213 A1 | 1/2013 |

OTHER PUBLICATIONS

International Preliminary Report on Patentability dated Dec. 6, 2016 received for International No. PCT/US2015/034257, 11 pages.

* cited by examiner

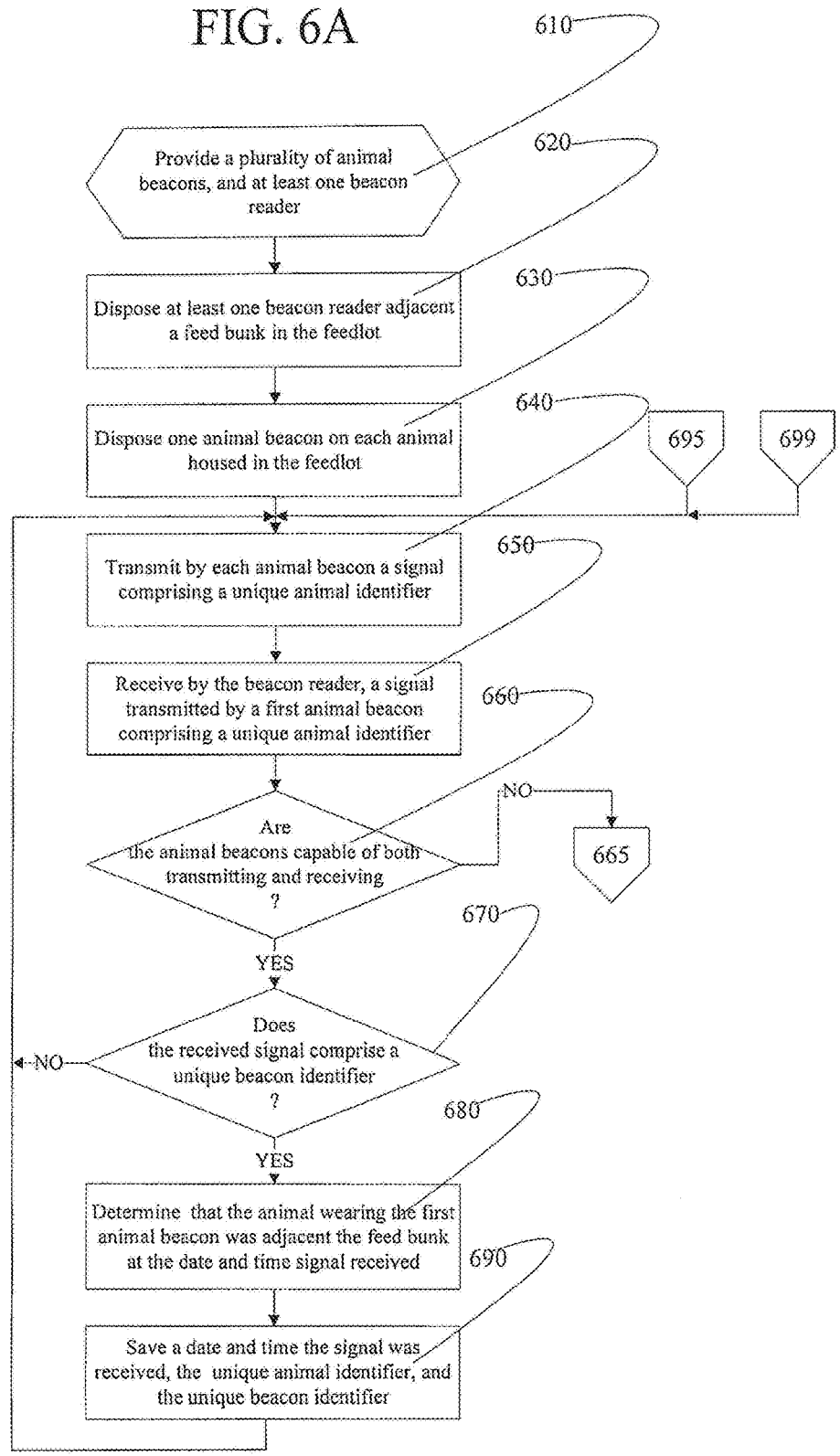

ly known
APPARATUS AND METHOD TO IDENTIFY MORBID ANIMALS

CROSS-REFERENCE TO RELATED APPLICATIONS

This Non-Provisional application claims priority to U.S. Provisional Application having Ser. No. 62/008,362 filed Jun. 5, 2014, which is hereby incorporated by reference herein.

FIELD OF THE INVENTION

This invention relates to monitoring and safeguarding the health of animals. In certain embodiments, the invention is directed to identifying morbid animals.

BACKGROUND OF THE INVENTION

Cattle generally spend four to twelve months in a feedlot to reach a mature weight. They are typically kept in pens of 50-300 animals with 150-300 square feet per animal. Each pen has a watering area and a feeding area. A sick animal's interaction history with these areas can be indicative of morbidity.

Detecting morbid animals in commercial feedyards is difficult. The modus operandi is for a "pen rider" to ride amongst the animals and visually evaluate each animal and remove morbid animals from the pen so that they can be treated with appropriate medications. A pen rider will typically be responsible for riding 5000 animals. Given the pay scale of pen riders, the astute concentration required, battling environmental elements, and that animals often hide their symptoms in the presence of man, detecting sick animals is very challenging.

Morbid animals have poorer performance (average daily gain and feed conversion) than their healthy counterparts. Not treating morbid animals in a timely fashion can exacerbate the morbidity and contribute to death. Finding and treating sick animals as early as possible allows the medicaments to be more effective. The current value of an average head of cattle in a feedyard is about $1600, thus minimizing sickness and death loss is paramount to a commercial feedyard's financial success. What is needed is a simple, dependable, and cost-effective method to identify sick animals so that they may be removed from the pen and treated appropriately in as timely a manner as possible.

SUMMARY OF THE INVENTION

A method to identify morbid animals housed in a feedyard having a feed bunk is disclosed. The method includes providing a plurality of animal beacons and at least one beacon reader, placing the beacon reader adjacent the feed bunk, transmitting by a first animal beacon a first signal comprising a first unique identifier for a first animal wearing the first animal beacon, wherein the first animal is housed in the feedyard, receiving by the beacon reader the first signal, and based upon the first signal, determining a proximity of the first animal to the feed bunk.

BRIEF DESCRIPTION OF THE DRAWINGS

The invention will be better understood from a reading of the following detailed description taken in conjunction with the drawings in which like reference designators are used to designate like elements, and in which:

FIG. 6A summarizes certain initial steps of Applicants' method to identify morbid animals;

DETAILED DESCRIPTION OF THE PREFERRED EMBODIMENTS

Figure 1:
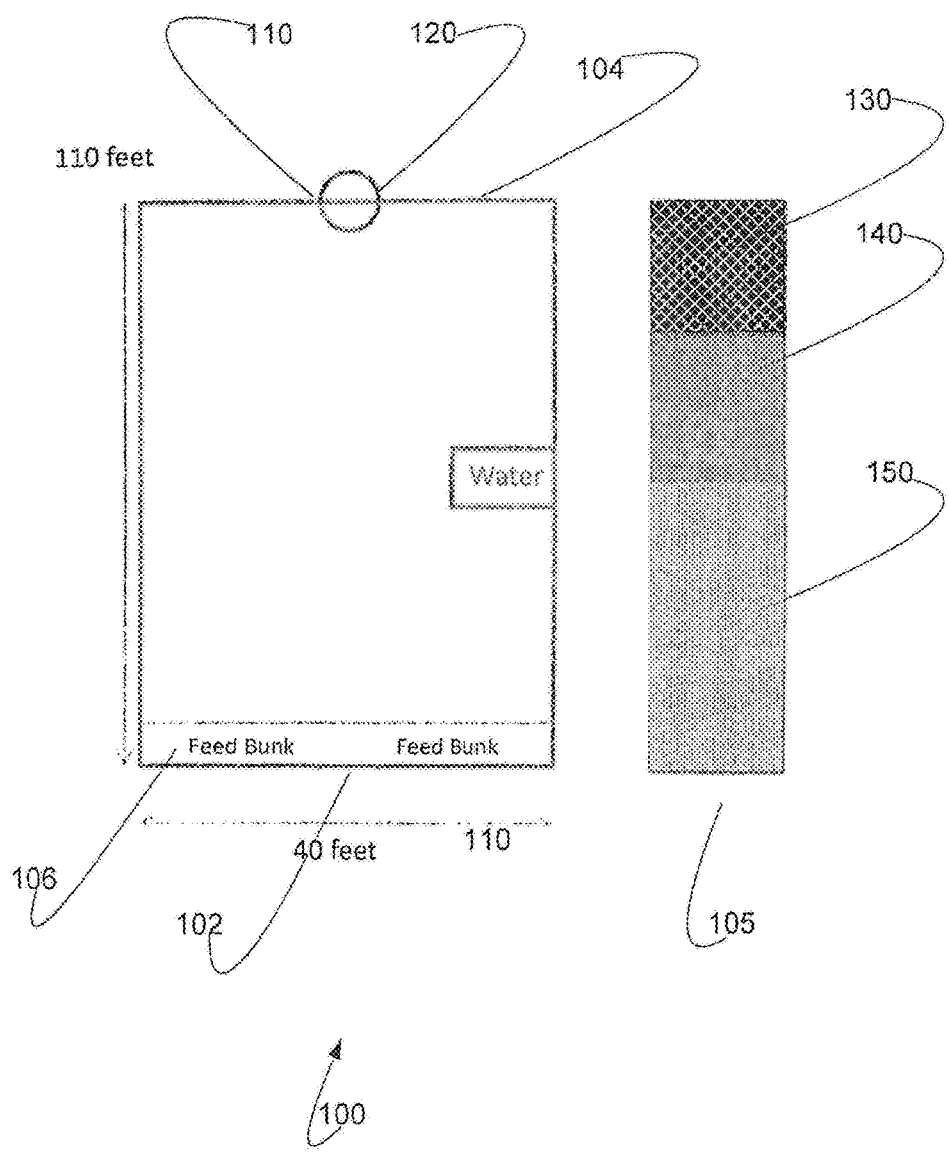
FIG. 1 illustrates a signal strength pattern for readers 110/120 with respect to animal beacons disposed within feedlot 100.

This invention is described in preferred embodiments in the following description with reference to the FIGS., in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Morbid cattle have different eating and drinking patterns from those of healthy cattle. Prior art systems provide passive electronic ear tags for each animal and a receiver placed in the feed bunk or near the water tank to monitor the number of times an individual animal eats or drinks By "passive" ear tags, Applicants mean ear tags that do not include a power source therein.

Applicants have found this type of passive ear tag identification ineffective at a distance and is also quite expensive when widely deployed, as it requires multiple high-powered readers that result in a high-cost infrastructure, such as commercial electric power installed at each reader in large or remote grazing areas or cattle feedlots.

Applicants, however, utilize a new technology for their animal beacons, where that technology requires low reader power, and results in low beacon cost. Ear tags are typically used for cattle identification. The location of Applicants' animal beacons should not be construed as only built into an ear tag. Rather, in certain embodiments Applicants' animal beacons are implemented in other items of attachment, such as and without limitation a nose ring, harness, head stall, ankle attachment, permanent sticker, etc. Popularly known as BLUETOOTH perhaps its best known application has been in communicating from a cellular telephone to a low-cost headset for hands-free telephony. There is defined a new low-power version designated BLUETOOTH LOW ENERGY (BLE). This system communicates using a very low signal power that lends itself well to long-lasting battery-powered tags. BLE tags can be configured as dedicated transmitters, or they can be reconfigured for both receiving and transmitting.

Applicants configured a BLE based application solution that can track a beacon location despite a high density of similar beacons in a defined space where the tagged animals are both dynamic in movement and prone to interfering with animal beacon transmissions, resulting in giving false location status via their RSSI (Received Signal Strength Indicator) signal strength transmission or no RSSI received signal at all. RSSI is a relative measure of signal power as experienced at the receiver. Ignoring interference, the higher the recorded RSSI value, the closer the beacon/transmitter is to the reader/receiver.

Applicants' method requires the ability to track the location over time of cattle in commercial feedlots with attached animal beacons, and their proximity history to feeding or watering areas, resulting in an ability to determine which animals have a health-related condition (morbid, missing from their normal area, dead/alive, abnormal movement/behavior versus the rest of the population) and to alert the appropriate personnel to such conditions. In addition, Applicants' apparatus and method provide a tool to locate a specific animal amongst hundreds of pen mates.

Applicants' system and method are pertinent to situations where animals or people are in a defined space and there is a need to proactively have a status of their location relative to something (food, etc) and use the location/movement history to determine health condition/status. Examples of these situations include: (1) determining morbid beef/dairy cattle location history to their food and water areas. Tracking socialization and pen behavior changes including isolation from the group and/or long periods away from the feeding area. The cattle identified as morbid are then pulled for treatment, (2) determining morbid and or missing cattle in open range/pasture environments by documenting their visits to watering and feeding areas, (3) implementing the concepts in Items 1 and 2 to also include pigs, chickens, buffalo, goats, and sheep, (4) determining during training and/or competitive events if athletes are visiting the hydration supply area and if there are signs of dehydration via sensors integrated into the animal beacon, (5) determining a wounded soldier's identity/location and health status as data in deciding the risk/reward of a field rescue attempt, (6) zoos with a need to review the eating behavior of their animals. Additionally, zoos could supply an application to mobile devices that allows patrons/visitors to learn about the specific animal(s) that are closest to their location. (7) cruise ship travelers could be tracked allowing automated counting disembarking and onboarding during ports of call. Distribution of passengers tracked during cruise for the purpose of staff or food allotment. Real time distress signal for notification of passenger overboard.

Applicants engineered their animal beacons to overcome the BLE design capability limitations that presented significant obstacles to its use. Applicants' animal beacons were designed (battery size, beacon power setting, beacon transmit time) for broadcast or transmit only to optimize beacon cost and prolong battery life for a required 2 years. Applicants' beacons transmit a unique ID number, a location (i.e. feedlot or ranch) ID, and a pen number. In certain embodiments, Applicants' beacons transmit a signal strength that could be read and correlated to the distance of the beacon and its reader (RSSI value).

The major technical obstacles include a high-density population of beacons in the feedlots with transmissions arriving at a reader simultaneously and canceling each other, and for the impact the cattle had on interference due to the high water content of the body that caused many beacon transmissions to be received by the reader with a false low RSSI signal that indicates the beacon is farther away from the reader than it actually is.

Applicants' apparatus and method address these inherent capability issues resulting from a large number of animal beacons being read by a plurality of beacon readers. Moreover, the RSSI signal strength comprises data necessary for Applicants' method. However, the beacons are on living animals, and the beacons' RSSI signal strength is degraded if it passes through any part of a living asset before being received by the reader.

In addition, a BLE RSSI value received at the reader has a +/−3 dBm accuracy, wherein the associated distance variation increases with lower RSSI value. Any additional decrease in accuracy, from interference or otherwise, would result in location accuracy that was not suitable.

Unlike passive RFID and active RFID; RSSI is simply a crude signal strength indicator to give an indication of wireless connectivity success. As a location tool a RSSI signal strength can provide a general proximity of +/−5 to 10 feet of location accuracy, and this range of variation increases the greater the distance between animal beacon and reader.

Applicants determined via testing that morbid animals generally stay away from the feeding area. Pilot testing showed that if the method only looked for cattle at an RSSI signal strength of −65 dBm to −70 dBm or closer from the feed bunk fence (5-20 feet) we were able to differentiate between healthy and morbid cattle. Location accuracy via RSSI was adequate for this application.

In certain embodiments, Applicants utilize a plurality of animal beacons in combination with a plurality of beacon readers. Although not developed for identification purposes, Applicants have modified the technology underlying the BLE system. In certain embodiments, Applicants use a plurality of beacon readers spaced at approximately every 20-40 feet (or more) along a feed bunk periphery thereby allowing the association of strong RSSI readings demonstrating that the animal was near a food source.

A centralized beacon reader, consuming low energy, does not require power line runs, and can simply use assets already purchased for other purposes, such as a so-called 'smart' phone or a portable laptop or tablet computer. Applicants' animal beacon is able to transmit unique identification information that this central reader recognizes, in combination with sensor data and a signal strength report. Applicants' method correlates these strength-of-signal reports to the reader's distance from the transmitting tag. Use of signal strength reports enables the ability to track each animal and its movement over time within a defined area.

In certain embodiments, Applicants' beacon "readers" are configured to wirelessly retransmit captured data into a higher level communications network such as a local wireless Wi-Fi (IEEE 802.11) system. In certain embodiments, this Wi-Fi network can then forward the data on to a so-called "cloud-based" remote storage system for final data storage, for evaluation, and to generate any resulting action prompts.

In certain embodiments, Applicants' animal tag comprises a BLE integrated circuit chip, a microprocessor chip, a timing circuit, and a miniaturized radio antenna. The microprocessor chip encodes a unique, re-assignable identifying code and relies on the built-in timing circuit. Inexpensive readers monitor such parameters as temperature and acceleration at timed intervals.

In certain embodiments, Applicants' beacon comprises one or more geographical position sensors (GPS). Applicants have packaged the BLE circuitry and a power source in one rugged, inexpensive and lightweight device.

Using Applicants' system and method, the beacon transmissions are brief in duration, and infrequently made. As a result, small sized batteries can provide power for twelve to sixty months of tag operation.

In certain embodiments, Applicants apparatus and method utilizes a flexible ear tag that includes a pocket or trunk that encloses the animal beacon providing protection from moisture along with a tamper evident seal. In certain embodiments, Applicants' flexible ear tag comprising a pocket or trunk housing. In certain embodiments, that pocket/trunk is configured such that a portion of the housing is coated with a material that blocks or absorbs electronic transmissions. In these embodiments, Applicants' beacon reader only receives signal transmissions when an animal is substantially facing that beacon reader. On the other hand, when the animal faces away from the beacon reader, Applicants' beacon reader does not receive signals from the beacon disposed on that animal.

A system owner can reuse a beacon with beacon reprogramming. In certain embodiments, the pocket or trunk includes an additional passive LF (low frequency), HF/NFC (high frequency/near field communication), or UHF (ultra-high frequency) tag. These short range technologies allow an individual reading of the nearest ear tag without any chance of simultaneous reads from other close proximity animals. The capabilities of Applicants' animal beacon ear tag can be extended for some cases that are exceptionally challenging or impossible for BLE technology in very short distance applications.

Figure 5:
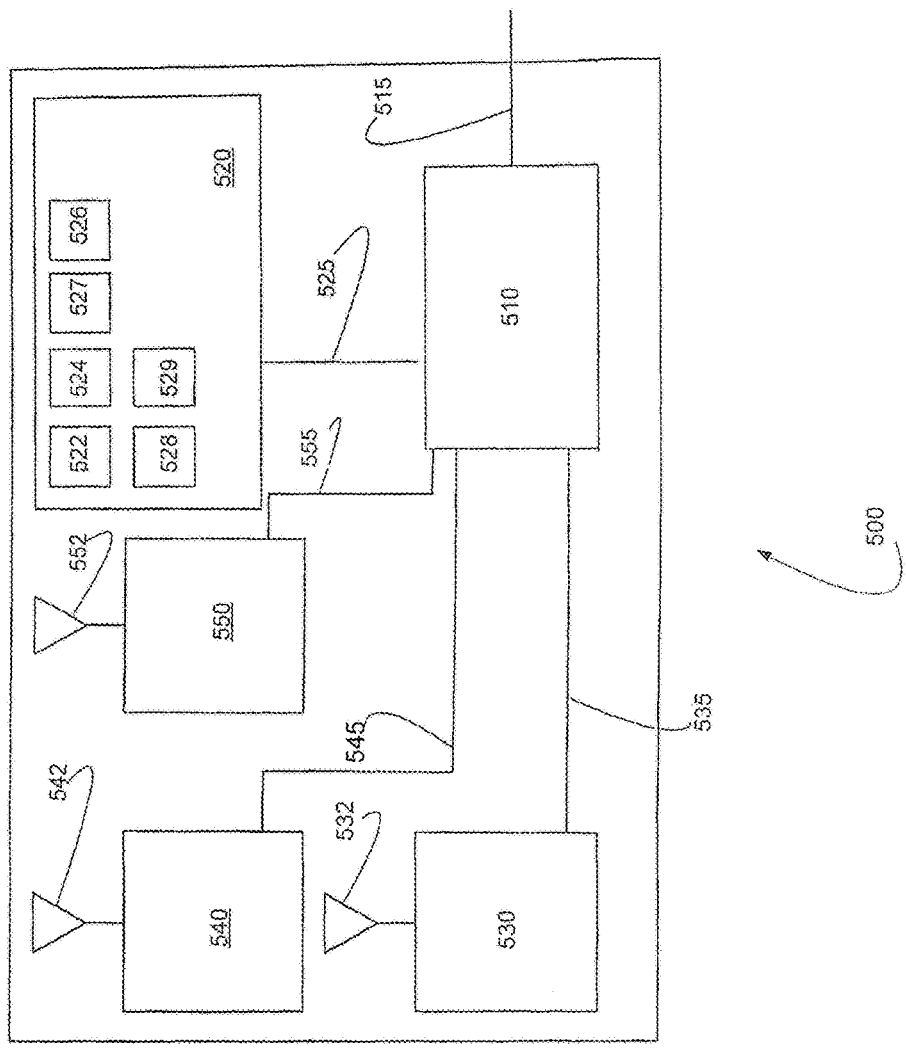
FIG. 5 illustrates the components comprising one embodiment of Applicants' beacon.

Referring now to FIG. 5, ear tag 500 comprises processor 510, memory 520 interconnected with processor 510 via communication link 525, optional GPS module 530 interconnected with processor 510 via communication link 535, BLE module 540 interconnected with processor 510 via communication link 545, and optional wireless communication module 550 interconnected with processor 510 via communication link 555. By way of example and not limitation, wireless communication module 550 may utilize a cellular service, WI-FI, or any other wireless communication protocol.

As those skilled in the art will appreciate, GPS module 530 comprises a wireless device that receives a plurality of signals from a plurality of GPS satellites, and determines a location for the GPS device using that plurality of signals. As those skilled in the art will appreciate, wireless communications module 550 comprises a wireless network permitting communication with one or more external computers or programmable devices in a network or with point-to-point communications.

In certain embodiments, processor 510 is interconnected by communication link 515 to an external data input device, such as and without limitation, a pointing device, mouse, key board, touch screen, and the like. Communication with an external computing device allows an ear tag to be encoded with information, such as a unique ID number (UID), a ranch ID, a pen number, and the like.

In the illustrated embodiment of FIG. 5, microcode 522, instructions 524, unique ID number 526, ranch ID 527, pen number 528, and signal strength database 529, are encoded in memory 520. In certain embodiments, memory 520 comprises non-volatile memory. In certain embodiments, memory 520 comprises battery backed up RAM, a magnetic hard disk assembly, an optical disk assembly, and/or electronic memory. By "electronic memory," Applicants mean a PROM, EPROM, EEPROM, SMARTMEDIA, FLASHMEDIA, and the like.

Data from the signal strength database is used to create an activity report for the animal wearing the beacon. Such an activity report captures the location(s) of the animal, and the movement of the animal, since the previous activity report was prepared and transmitted.

Processor 510 uses microcode 522 to operate ear tag 500. Processor 510 uses microcode 522, instructions 524, to operate GPS module 530, BLE module 540, and wireless communications module 550.

In certain embodiments, Applicants' module 540 has transmit capability, but no receive capability. In certain embodiments, BLE module transmits a signal about every 1-3 seconds. That signal comprises a unique ID (UID), and an activity report. In certain embodiments, the signal includes ambient temperature and battery voltage. In certain embodiments, the signal includes animal temperature, heart rate, real time blood testing, and respiration rate.

In certain embodiments, wireless communication device 550 comprises a transceiver with both transmit and receive capabilities. The signal transmitted by wireless communication module 550 comprises data showing all UIDs of fixed location beacons set at low power broadcast strength in range of the animal beacons (ear tags). In certain embodiments, an ear tag transmits its UID along with the UID of any fixed location beacon that is within close proximity of the ear tag. In this scenario a plurality of readers spaced evenly along the feed bunk is not required. In this case the ear tag reports on what fixed beacon locations it is within close proximity to.

A remote computing device receiving the transmission from wireless communication module 550 selects a specific ear tag to establish communication. Each ear tag can answer requests and/or defined functions from the remote computing device. In certain embodiments, each ear tag comprises a visual signal device, such as and without limitation, a light emitting diode ("LED"). In order to facilitate identifying a specific animal, the remote computing device can cause a LED disposed on the exterior of an ear tag to illuminate, thereby visually identifying a particular animal. In addition to LED illumination we propose the use of an electro chromic printed display that can alternate between black and white. In addition to visual identification we propose adding a beeper that can be energized to deliver audible identification.

Figure 3A:
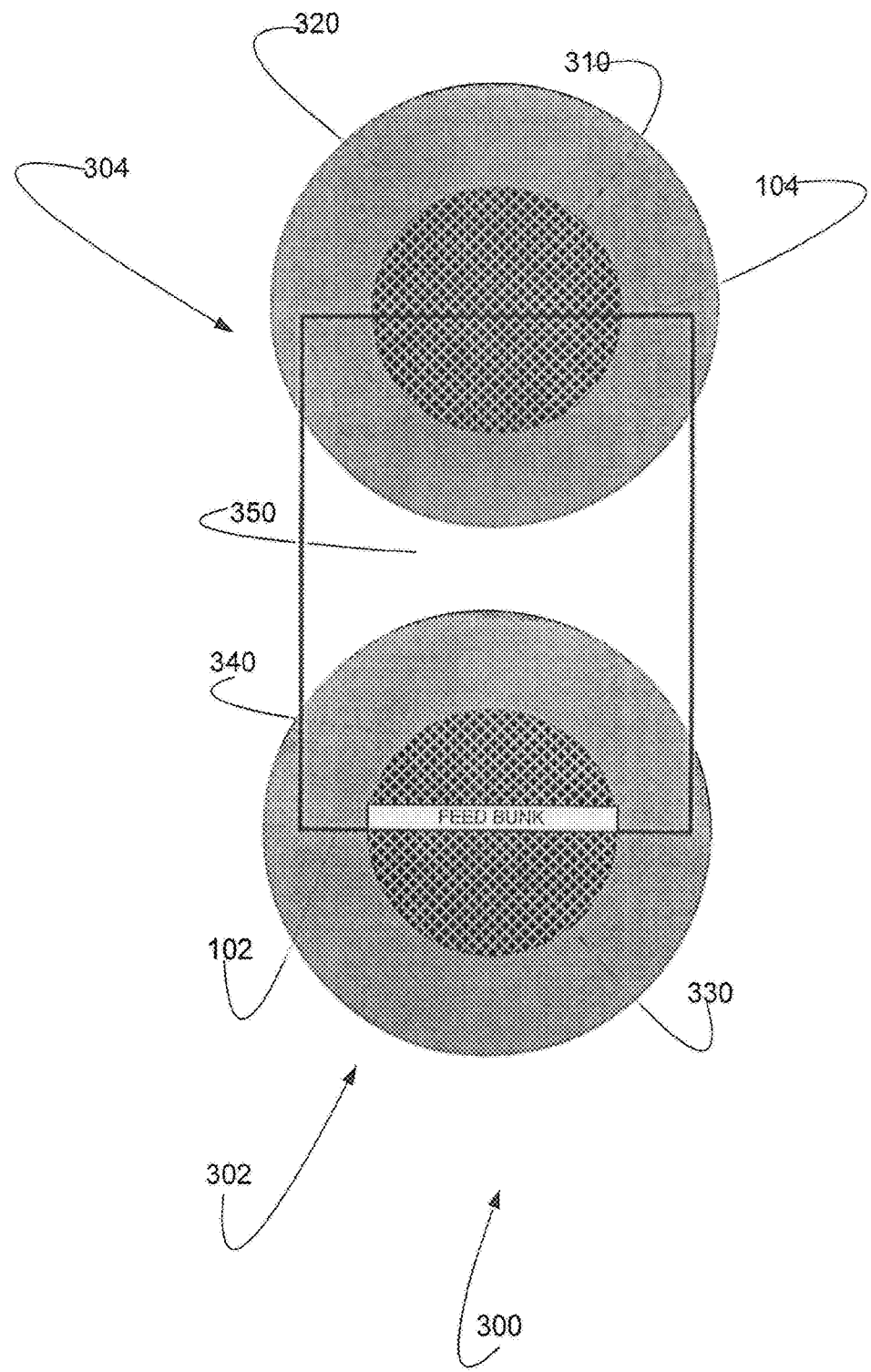
FIG. 3A illustrates signal strength areas using readers 110/120 and 210/220 with respect to animal beacons disposed within feedlot 100.
Figure 3B:
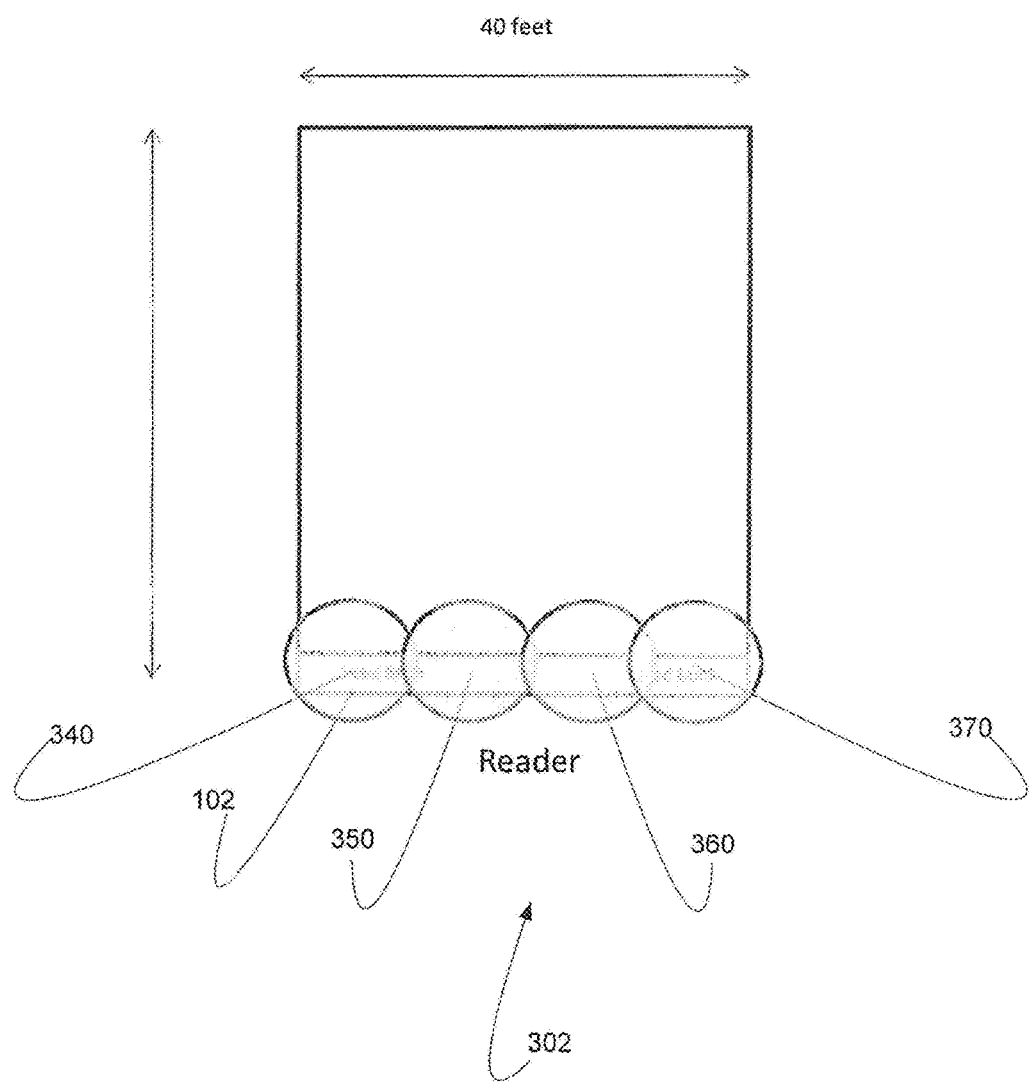
FIG. 3B illustrates the use of transmit and receive beacons disposed on a front portion of feedlot 100.

In certain embodiments, Applicants apparatus and method utilize a transmit and receive beacon that listens for special fixed location beacon UIDs as in FIG. 3B.

In addition, in certain embodiments Applicants' apparatus and method includes a method of finding a single animal in a pen by using a handheld reader that allows the user to isolate the RSSI readings from a single specified animal. In certain of these embodiments, the handheld output comprises a tone of changing frequency. In certain of these embodiments, the handheld output comprises a beep of changing period. In certain of these embodiments, the handheld output comprises screen output filling upon stronger RSSI readings. The pen rider is given ongoing feedback (audibly, visually, or vibratory) from the reader to assist in knowing he/she is getting closer to the desired animal.

In certain embodiments, Applicants' reader achieves 360 degree coverage by providing a separate BLE antenna on each of four edges. In certain embodiments, Applicants' apparatus and method include using a protective cover for the reader that limits coverage to approximately 90 degrees assuring the pen rider that the BLE signal is forward of a set orientation of the reader (mobile device).

BLE (unlike passive RFID) has no anti-collision capability. Anti-collision comprises a systematic method for the reader to identify all tags within its read field sensitivity range. If two beacon transmissions arrive at the reader at the same time neither will likely be read. Applicants' animal beacons broadcast randomly over 3 channels to the readers in an attempt to reduce the odds of two beacon transmissions arriving simultaneously on the same frequency.

In addition, Applicants have configured each beacon to add a random 0-10 millisecond delay before each transmission to further reduce the chance of beacon collisions. However, use of a random 0-10 millisecond delay for each beacon transmission can be effective for a few, to a few dozen, beacons broadcasting to a given reader.

Applicants' feedlot embodiments can have 1000-1500 beacons transmitting to a common reader. With this number of beacons, beacon transmission data would be lost due to beacon collisions (actually lost over 80%).

Applicants' method compensates for the beacon collisions by setting the animal beacon adjustable transmission timing to a faster rate, for example and without limitation, at every 1 second. Applicants' method need only determine cattle proximity to food and water every few minutes.

By evaluating the RSSI data in time blocks instead of true RTLS (Real Time Location System) individual beacon transmissions, Applicants insure the time block is long enough to gain some beacon reads despite beacon broadcast collisions. In certain embodiments, Applicants' method evaluates the cattle location versus the time block instead of by every discrete beacon transmission. In certain embodiments, Applicants' method saves all recorded beacon reads for a given beacon at a given reader over 5 minutes, and then calculates a time block RSSI value for the 5 minute block instead of calculating a distance from every 1-3 second beacon transmission.

A method was required wherein only RSSI data that had no water interference reductions was used. BLE operates near 2.45 GHz. This frequency has a very high energy absorption rate (>95%) if it passes through water. Animals and people are essentially large water reservoirs to a 2.45 GHz transmission. Applicants verified animals would decrease the BLE RSSI signal strength by about half if the animal was between the beacon and the reader. Thus, an animal could appear be 30-50 feet away from the reader when it is actually only 5-10 feet away. This location/distance data is crucial to Applicants' cattle health evaluation solution.

Applicants, however, had no way to tell if a beacon RSSI value was reduced because another animal got in the way or the animal turned its head and created interference, or was actually on the move. A way was required wherein only RSSI data that had no water interference reductions was used. Signal strength could also be reduced in the event the primary path between the beacon and the reader was blocked by animal tissue. An indirect and longer path could also be accomplished by a beacon transmission reflecting off a metal fence post before reaching the reader also resulting in a reduced signal strength.

Applicants' method sets a time block to look at recorded RSSI values for a given beacon because of beacon transmission collisions. Applicants refined their method to ONLY use the highest/strongest RSSI values in that 5 minute block to represent the RSSI value and cattle distance for that 5 minute time period.

BLE RSSI values can be falsely low due to interference or energy absorption by water BUT are typically NOT falsely high. This data filtering concept put the odds in Applicants' favor that they used RSSI data that were not impacted by interference. This RSSI data filtering technique also compensated for the inherent +/−3 dBm range in RSSI accuracy.

To further minimize variability in RSSI data that had been altered by water, Applicants' invented a reader pole fixture with an adjustable height setting capability for the attached reader. Applicants found the optimal setting was 150% to 200% the height of the animal beacon off the ground. In the case of beef cattle, the beacon height on the animal's ear was 3 to 4 feet off the ground, and therefore, the reader height was set to between about 4 feet to about 6 feet. Too low a reader height increases the odds of RSSI interference. Too high a reader height results in lost resolution in determining how close the cattle are to the food source (which is at ground level while the reader itself is 4.5 to 6 feet above ground level.

Applicants determined that defining location during a time block and the use of only the highest recorded RSSI values during that time block proved sufficient to minimize the functional deficiencies of BLE. This resulted in data that identified morbid cattle needing treatment via their lower than normal visits to the feeding area. The information the BLE solution tracked was found to give morbid cattle alerts 24 to 72 hours in advance of physical inspections of the cattle.

Table 1 recites measured BLE signal strengths at various distances from the beacon reader. The measured signal strengths from Applicants' BLE ear tag, where that ear tag was within about 15 feet of a Beacon reader were categorized as HIGH. The measured signal strengths from Applicants' BLE ear tag, where that ear tag was within about 15-35 feet of a beacon reader were categorized as MEDIUM. The measured signal strengths from Applicants' BLE ear tag, where that ear tag was within about 35-85 feet of a beacon reader were categorized as LOW.

TABLE 1

| SIGNAL STRENGTH (−dBm) | DISTANCE FROM READER (feet) | SIGNAL QUALITY (relative ranking) |
| --- | --- | --- |
| −60 | 3-8 | HIGH |
| −65 | 7-15 | HIGH |
| −70 | 10-23 | MEDIUM |
| −75 | 20-35 | MEDIUM |
| −80 | 35-55 | LOW |
| −90 | 50-85 | LOW |

Figure 7:
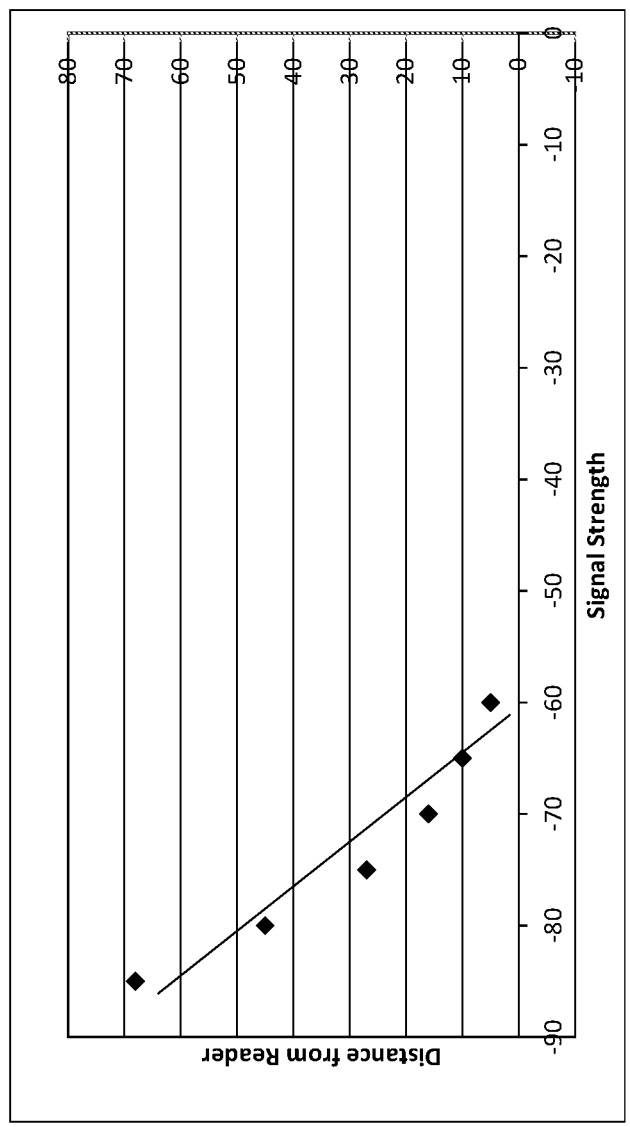
FIG. 7 graphically recites the data of Table 1.

FIG. 7 is a plot of the data from Table 1. FIG. 7 further comprises a straight-line, linear regression analysis of that data. The linear regression shows that the signal strength data is essentially a linear fit with distance of the transmitting beacon from the beacon reader.

In certain embodiments, Applicants' method comprises an animal ID verification and transport validation system for the life segment prior to arrival at a feedlot. For the pastureland segment, Applicants equip a beacon reader with sufficient memory to record a week's worth of beacon reads. Set the beacon power level to high (100 meters or more) with a transmission frequency of approximately 10 seconds. Install the reader near the watering location with automated connection to either a cell phone or manually accessible download of data. Use an application that documents most recent visit to watering area for the list of identified animals. Combining the complete list of watering locations and associated readers can help in identifying the missing animals. These animals could then be found on the pastureland with the assistance of a long-range beacon transmitter that could be added to the standard beacon design.

For tracking of animals while on a transport trailer, the power level for the beacon can be reduced to low with an associated broadcast distance of approximately 3 meters. The frequency of transmission can be set at approximately 0.5 second.

A system for providing the shipper automated alerts of container door openings during transport would apply to generalized cargo of significant value (not only cattle. A trailer based system using a beacon reader with the device fixed in location near the front wall (behind the driver's cab) and facing toward the rear door. The phone can be connected to an external antenna to allow the origination of a cell call to share an alert in the case that a certain animal is not found over a set period of time.

Additionally, a beacon can be attached to the rear door such that its broadcast is blocked by reflective material when the rear door is shut. When the door is shut, that beacon signal does not reach the beacon reader. When an open door event happens, then the beacon transmission reaches the beacon reader. In certain embodiments, an application included with Applicants' beacon reader can initiate a call informing an overall monitoring system that a door has been opened along with time stamp and physical location. So, in the event of a closed trailer door the reader would sense no RSSI reading (or a low RSSI reading) from the trailer door beacon. In the event of an open trailer door event, the reader would sense a high RSSI value. An application could record and report the time of open door events via an automated cell call.

Field experiments in cattle feedlot pens using this system have shown it effective enough, even without additional sensors, to determine an animal's placement and behavior within the herd and within the pen, with sufficient accuracy to discern with reasonable certainty a morbid animal from a healthy one. Adding additional sensors and/or adding readers increases the system's accuracy.

Referring now to FIG. 1, feedlot 100 comprises a rectangular shape with two 40 feet long front and rear portions and two 110 feet long sides. A feed bunk is disposed along front 102.

In the illustrated embodiment of FIG. 1, two beacon readers 110 and 120 are disposed along a rear side 104. In certain embodiments, use of beacon readers 110 and 120 comprises a "N+1" redundancy. In these embodiments, should one of the two beacon readers fail, the other beacon reader continues to operate.

In other embodiments, use of beacon readers 110 and 120 results in enhanced operational lifetime. In certain embodiments, beacon reader 110 and beacon reader 120 are alternatingly made operational for about 12 hours each day.

Signal strength indicator 105 illustrates a linear broadcast pattern which includes a high signal strength area 130, a medium signal strength area 140, and a low signal strength area 150.

Figure 2:
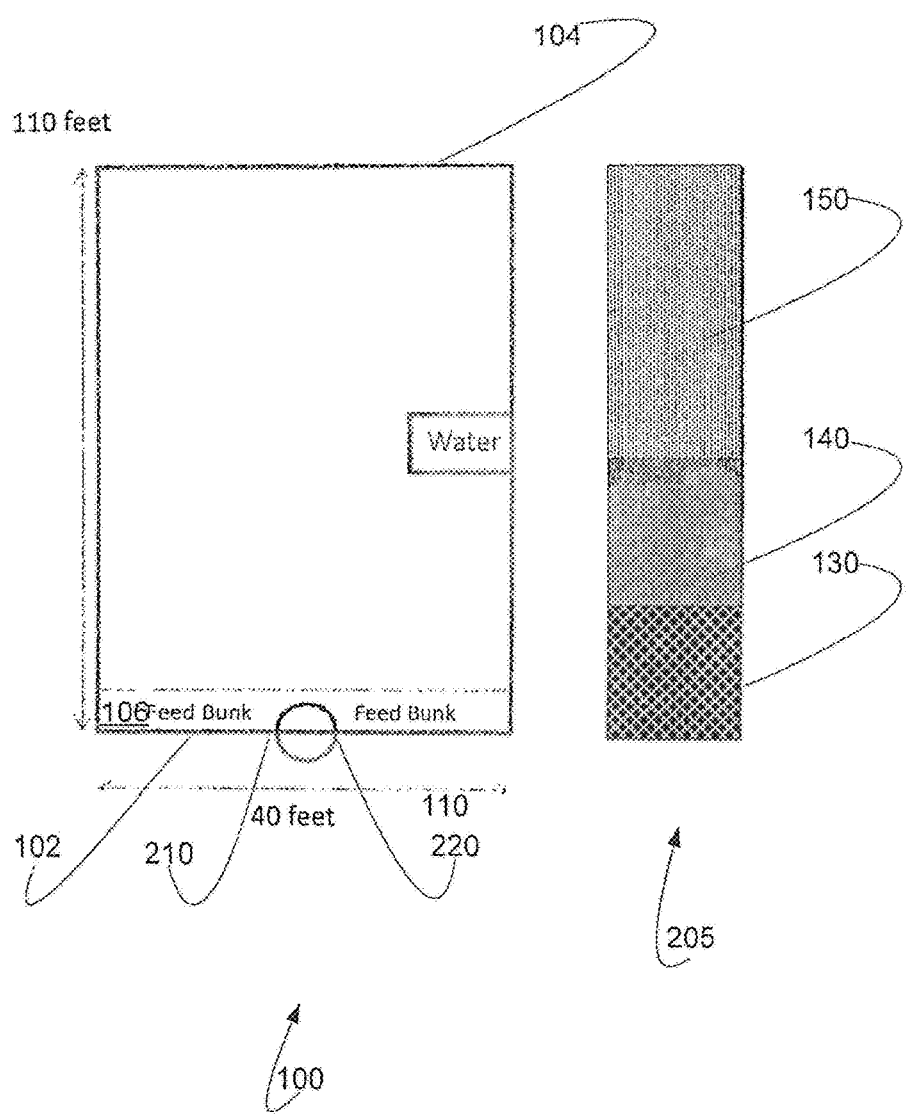
FIG. 2 illustrates a signal strength pattern for readers 210/220 with respect to animal beacons disposed within feedlot 100.

Referring now to FIG. 2, in the illustrated embodiment of FIG. 2, two beacon readers 210 and 220 are disposed along a front side 102 of feedlot 100. In certain embodiments, use of beacon readers 210 and 220 comprises a "N+1" redundancy. In these embodiments, should one of the two readers fail, the other beacon reader continues to operate.

In other embodiments, use of beacon readers 210 and 220 results in enhanced operational lifetime. In certain embodiments, beacon reader 210 and beacon reader 220 are alternatingly made operational for about 12 hours each day.

Signal strength indicator 205 illustrates a linear reception pattern which includes a high signal strength area 130, a medium signal strength area 140, and a low signal strength area 150.

FIG. 3A illustrates an overhead view of feedlot 300, wherein feedlot 300 comprises the same dimensions as does feedlot 100 (FIGS. 1, 2), where a beacon reader is disposed along a front portion 102, and a second beacon reader is disposed along a rear portion 104. Circular reception pattern 302, associated with a beacon reader disposed along a front portion 102 of feedlot 100, includes a high signal intensity area 310 and a medium signal intensity area 320.

FIG. 3A further illustrates circular reception pattern 304, associated with a beacon reader disposed along a read portion 104 of feedlot 100, includes a high signal intensity area 310 and a medium signal intensity area 320.

FIG. 3A illustrates five (5) different reception areas disposed within feedlot 100. If an animal is physically located within reception area 310, then a signal received by a beacon reader disposed on the rear portion 104 will receive a high intensity signal transmitted by Applicants' animal beacon, i.e. ear tag, attached to the animal. If an animal is physically located within reception area 330, then a signal received by a beacon reader disposed on the front portion 102 will receive a high intensity signal transmitted by Applicants' animal beacon, i.e. ear tag, attached to the animal.

If an animal is physically located within reception area 320, then a signal received by a beacon reader disposed on the rear portion 104 will receive a medium intensity signal transmitted by Applicants' animal beacon, i.e. ear tag, attached to the animal. If an animal is physically located within reception area 340, then a signal received by a beacon reader disposed on the front portion 102 will receive a medium intensity signal transmitted by Applicants' animal beacon, i.e. ear tag, attached to the animal.

If an animal is physically located within reception area 350, then a signal received by a beacon reader disposed on the rear portion 104, and a signal received by a beacon reader disposed on the front portion 102, will receive a low intensity signal transmitted by Applicants' animal beacon, i.e. ear tag, attached to the animal.

FIG. 3B shows four (4) transmit and receive feed bunk beacons 340, 350, 360, and 370, disposed along front 102 of feedlot 302. Feed bunk beacons 340, 350, 360, and 370, are stationary Feed bunk beacons 340, 350, 360, and 370, each broadcast a unique beacon identifier that indicates that the signal comprising that unique feed bunk beacon identifier was broadcast by a stationary feed bunk beacon. In addition, the output power of feed bunk beacons 340, 350, 360, and 370, can be adjusted such the signals broadcast by those feed bunk beacons 340, 350, 360, and 370, can be received within a range of about five (5) feet or fewer from the transmitting feed bunk beacon.

In the embodiments of Applicants' method that utilize the system 302 of FIG. 3B, animals are tagged with transmit and receive beacons. When an animal is adjacent to a feed bunk, that animal's beacon can receive a signal broadcast by a stationary feed bunk beacon. Upon receipt of a signal comprising a unique feed bunk beacon identifier, the receiving animal beacon transmits a signal comprising the animal's unique identifier in combination with the received unique feed bunk beacon identifier. In these embodiments, Applicants' method can determine the frequency that each animal in the feedlot approaches the feed bunk. As a result, when using the system of FIG. 3B, there is no need to use a RSSI signal to determine an animal's proximity to a feed bunk.

Figure 4:
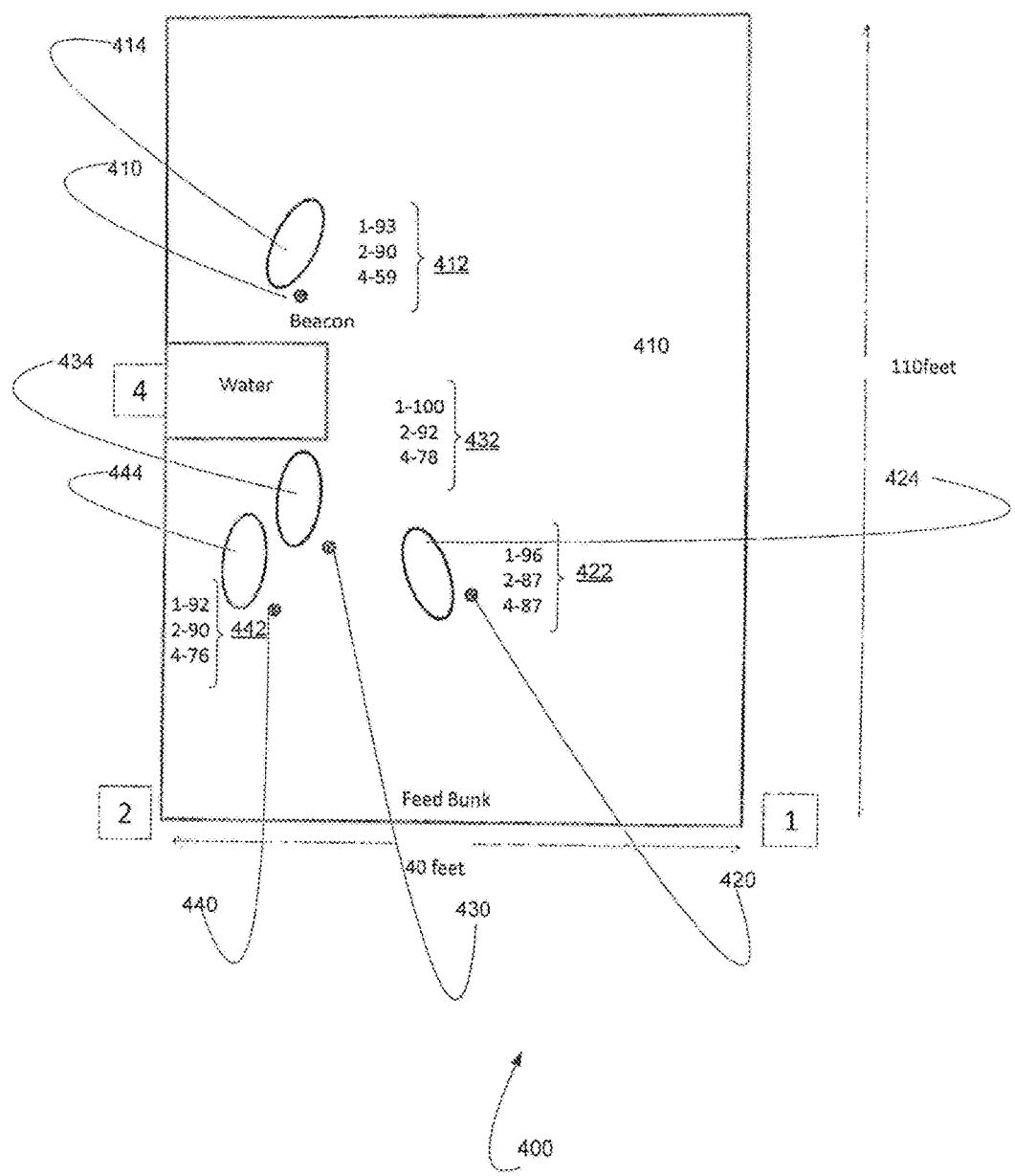
FIG. 4 illustrates the use of three (3) readers.

FIG. 4 illustrates the use of three (3) beacon readers, namely readers 1, 2, and 4. In the illustrated embodiment of FIG. 4, four (4) animals are located within feedlot 400, namely animals 412, 422, 432, and 442. FIG. 4 recites signal strength data comprising measured signal strength detected by beacon readers 1, 2, and 4. As shown in FIG. 4, use of three beacon readers allows a more precise "triangulation" using measured signal strengths to define a likely location 414 for animal 412, 424 for animal 422, 434 for animal 432, and 444 for animal 442.

The following examples are presented to further illustrate to persons skilled in the art how to make and use the invention. These examples are not intended as a limitation, however, upon the scope of the invention.

EXAMPLE 1

Twenty (20) heifers were enclosed in pens 33 and 34. None were proactively given medical treatment prior to being placed in the feedlot pens. Rather, the animals were only treated as needed per visual inspection. Some were treated prior to being put in pens as they were morbid as received; these pre-pen treatments were not included in this table.

BLE data was run blind to the feedlot team making visual inspections and only shared with that feedlot team after they had completed their evaluations. BLE data suggested some heifers were ill enough to have their eating habits changed but recovered without treatment.

BLE data had technical interruptions (a day with no recorded data) which may have resulted in NOT identifying more morbid heifers. Note: visual inspection quality was thought to be above normal due to skills of this feedlot team and small pen population (10 versus normal 200-300). Note: "too sick to pull" means the heifer was treated in the pen as it was too weak to be taken to the barn for treatment because the illness was well advanced.

Table 2 summarizes the results of the BLE evaluations and the visual evaluations. It is important to note that in typical industry practice the pen rider's ability to identify a morbid animal via visual clues is subjective and error prone. Applicants' apparatus and method accurately tracked daily feed bunk visits. Based upon the frequency of feed bunk visits, Applicants identified those animals as likely morbid when exhibiting significantly below average cumulative time near the feed bunk.

TABLE 2

| EAR Tag #/ Pen # | BLE ALERT DATE | VISUAL BASED ALERT DATE | TREATMENT DATE |
| --- | --- | --- | --- |
| 5462/33 | none | Oct. 4, 2014 | Oct. 4, 2014 |
| 5463/33 | Sep. 24, 2014 | none | none |
| 5468/33 | Sep. 24, 2014 | none | none |
| | Sep. 28, 2014 | none | none |

TABLE 2-continued

| EAR Tag #/ Pen # | BLE ALERT DATE | VISUAL BASED ALERT DATE | TREATMENT DATE |
| --- | --- | --- | --- |
| 5469/33 | Sep. 22, 2014 | Sep. 24, 2014 | Sep. 24, 2014 |
| | Sep. 26, 2014 | Sep. 28, 2014 | Sep. 28, 2014 |
| 5471/33 | Sep. 21, 2014 | none | none |
| | Oct. 10, 2014 | none | none |
| 5477/34 | Sep. 22, 2014 | none | none |
| 5475/34 | Sep. 24, 2014 | Oct. 4, 2014 | Oct. 4, 2014 |
| | none | Oct. 9, 2014 | Oct. 9, 2014 |
| 5476/34 | Sep. 22, 2014 | Sep. 25, 2014 | Sep. 25, 2014 |
| | Sep. 27, 2014 | Oct. 3, 2014 | Oct. 3, 2014 |
| | none | Oct. 8, 2014 | Oct. 8, 2014 = too sick to pull |

Figure 6B:
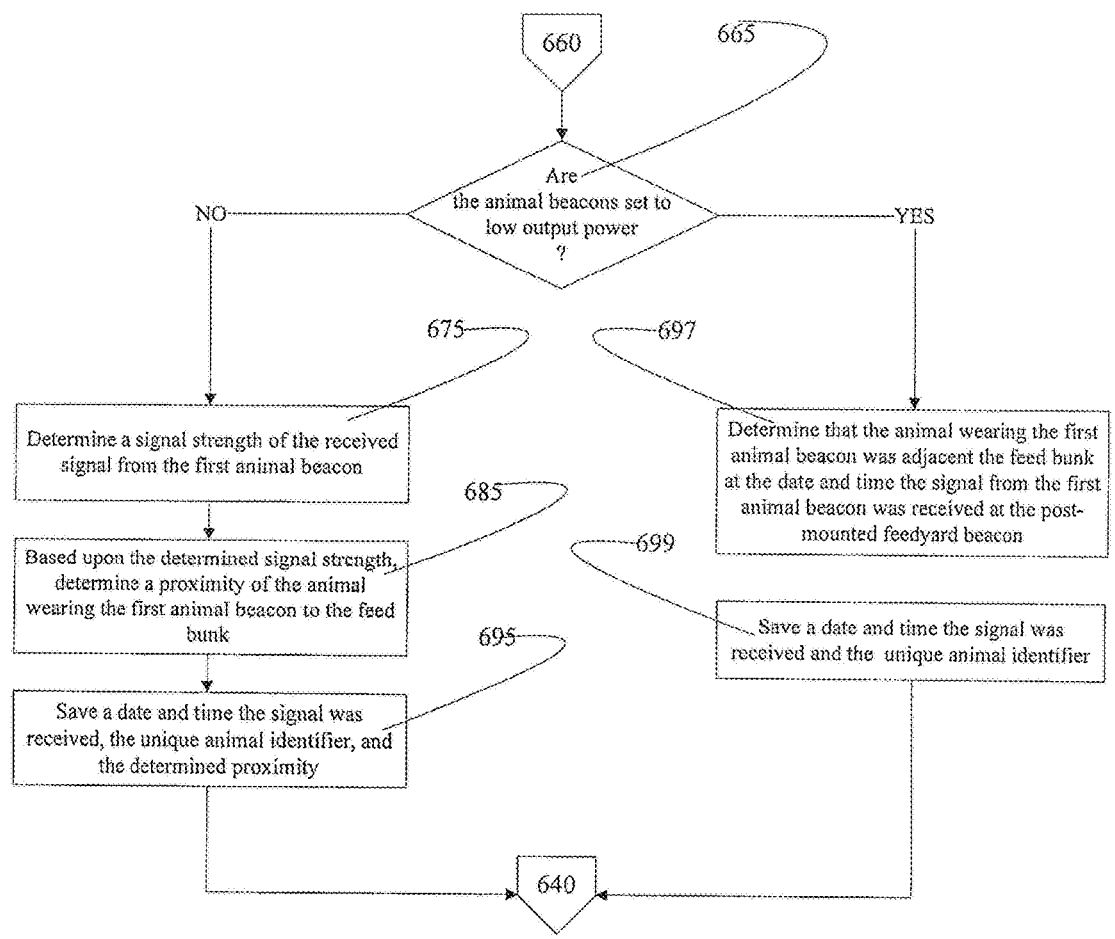
FIG. 6B summarizes certain additional steps of Applicants' method.

FIGS. 6A and 6B summarize Applicants' method using their animal beacons and optionally feed lot beacons. Referring now to FIG. 6A, in step 610 the method provides a plurality of animal beacons and at least one beacon reader. In step 620, the method disposes al least one beacon reader adjacent a feed bunk in a feedlot. In step 640, the method disposes one animal beacon on each animal housed in the feedlot.

In step 640, each animal beacon transmits a signal comprising a unique animal identifier. In step 650, the beacon reader receives a signal transmitted by a first animal beacon comprising a first unique animal identifier.

In step 660, the method determines if the animal beacons are capable of both transmitting and receiving signals. In certain embodiments, Applicants' method utilizes transmit-only animal beacons, wherein the method determines a signal strength of a signal received from an animal beacon. Applicants' method translates that determined signal strength into an approximate distance from the beacon reader.

In certain embodiments, Applicants' method utilizes transmit-only animal beacons set to low power broadcasts (short distance), in combination with post (fixed location) beacon reader(s) capable of both transmitting and receiving. In certain embodiments, the transmit-only animal beacons are set to transmit a 0.01 Watt signals.

The post beacon reader(s) receive signals from the plurality of animal beacons, and then re-transmit a signal to data center, wherein that data transmission includes a unique animal identifier, a unique beacon reader identifier, the date/time the signal was received at the beacon reader.

In yet other embodiments, Applicants' method utilizes transmit and receive animal beacons, in combination with feedyard beacon(s) located at the feed bunk, and set to low output power. Each feedyard beacon comprises a unique feedyard beacon identifier. If an animal beacon receives a signal from a feedyard beacon, then the animal must be within about five (5) feet of the feedyard beacon. This necessarily means that the animal is adjacent the feed bunk.

In these embodiments, the beacon reader only saves the transmissions from the post beacons which are at the feed bunk. Each received transmissions would show which animals are near the post beacons and therefore which animals are near the feed bunk. With the secondary approach, Applicants avoid having to make use of reader signal strength as the only way to approximate distance to the animal.

In the event that the animal beacons are capable of both transmitting and receiving signals, then the method transitions from step 660 to step 670 wherein the method determines that the animal wearing the first animal beacon was adjacent the feed bunk at the date and time the signal from the first animal beacon was received. In step 690, the method saves a date and time that the signal was received from the first animal beacon, in combination with the unique animal identifier, and a unique beacon identifier. The method transitions from step 690 to step 650 and continues as described herein.

In the event that the animal beacons are not capable of both transmitting and receiving signals, then the method transitions from step 660 (FIG. 6A) to step 665 (FIG. 6B) wherein the method determines if the animal beacons are set to a low output power. If the method determines in step 665 that the animal beacons are NOT set to a low output power, then the method transitions from step 665 to step 675 wherein the method determines a signal strength of the received signal from the first animal beacon.

In step 685, the method determines a proximity of the first animal to the feed bunk at the time the signal from the first animal beacon was received. In step 695, the method saves a date and time the signal from the first animal beacon was received. In certain embodiments, the method also saves the unique animal identifier and the determined proximity of the first animal to the feed bunk. The method transitions from step 695 to step 650 and continues as described herein.

If the method determines in step 665 that the animal beacons are set to a low output power, then the method transitions from step 665 to step 697 wherein the method determines that an animal wearing the first animal beacon was adjacent the feed bunk at the date and time the signal from the first animal beacon was received at the post-mounted feedyard beacon.

In the 699, the method saves a date and time the signal was received and the unique animal identifier. The method transitions from step 699 to step 650 and continues as described herein.

While the preferred embodiments of the present invention have been illustrated in detail, it should be apparent that modifications and adaptations to those embodiments may occur to one skilled in the art without departing from the scope of the present invention.

We claim:

1. A method to identify morbid animals among a plurality of animals housed in a feedyard having a feed bunk based on proximity history of each animal among the plurality of animals to the feed bunk, comprising:
    providing a plurality of animal beacons and at least one beacon reader;
    placing said at least one beacon reader adjacent said feed bunk;
    providing a plurality of flexible ear tags, each comprising a pocket that encloses a respective animal beacon and being associated with each animal;
    repeatedly transmitting by each of the plurality of animal beacons a first signal comprising a unique identifier for a respective animal wearing said respective animal beacon, wherein said respective animal is housed in said feedyard;
    setting, by said at least one beacon reader, a time block;
    receiving during said time block, by said at least one beacon reader, a plurality of first signals from each of the plurality of animal beacons, wherein each of said plurality of received first signals from each of the plurality of animal beacons comprises a received signal strength indicator value ("RSSI Value");
    determining, by said at least one beacon reader, from said plurality of received first signals from each of the plurality of animal beacons during said time block, a received first signal comprising a strongest RSSI Value;
    based upon said received first signal comprising the strongest RSSI Value, determining a proximity of a respective animal wearing a respective animal beacon to said feed bunk;
    when said received first signal comprising the strongest RSSI Value is greater than −68 dBm, determining that a respective animal wearing a respective animal beacon having the strongest RSSI value is a healthy animal; and
    identifying, by said at least one beacon reader, at least one morbid animal among the plurality of animals housed in the feedyard wherein the at least one morbid animal has lower than normal visits to the feed bunk based on the proximity history of the at least one morbid animal to the feed bunk;
    wherein a portion of said pocket is coated with a material that blocks or absorbs electronic transmissions; and
    wherein:
    said at least one beacon reader only receives signals from an animal beacon when an animal wearing an ear tag is facing said at least one beacon reader; and
    said at least one beacon reader does not receive signals from an animal beacon when an animal wearing an ear tag is facing away from said at least one beacon reader.

2. The method of claim 1, wherein each of the plurality of said animal beacons is configured to transmit said first signal on any of three different output frequencies.

3. The method of claim 1, wherein said at least one beacon reader comprises a first non-transitory computer readable medium, said method further comprising encoding in said first non-transitory computer readable medium said unique identifier in combination with said proximity history of each animal to said feed bunk.

4. The method of claim 3, further comprising: determining a date and time when said at least one beacon reader receives said first signal from each of the plurality of animal beacons; saving by said at least one beacon reader said date and time when said at least one beacon reader receives said first signal from each of the plurality of animal beacons.

5. The method of claim 4, further comprising:
    transmitting by said at least one beacon reader to a remote data storage system said unique identifier, said date, and said time from each of the plurality of animal beacons;
    encoding in a non-transitory computer readable medium by said remote data storage system said unique identifier, said date, and said time from each of the plurality of animal beacons.

6. A method to identify morbid animals among a plurality of animals housed in a feedyard having a feed bunk based on proximity history of each animal among the plurality of animals to the feed bunk, comprising:
    providing a plurality of animal beacons and at least one beacon reader;
    placing said at least one beacon reader adjacent said feed bunk on a reader pole comprising an adjustable height, wherein said adjustable height is set to between about 4 feet and about 6 feet;
    providing a plurality of flexible ear tags, each comprising a pocket that encloses a respective animal beacon and being associated with each animal;
    repeatedly transmitting by each of the plurality of animal beacons using an output power of about 0.01 watts during a pre-determined time block a first signal comprising a unique animal identifier for a respective animal wearing said respective animal beacon, wherein said respective animal is housed in said feedyard;

receiving during said pre-determined time block, by said at least one beacon reader, a plurality of first signals from each of the plurality of animal beacons, wherein each of said plurality of received first signals from each of the plurality of animal beacons comprises a received signal strength indicator value ("RSSI Value");

determining, by said at least one beacon reader, from said plurality of received first signals from each of the plurality of animal beacons during said pre-determined time block, a received first signal comprising a strongest RSSI Value;

based upon said received first signal comprising the strongest RSSI Value, determining a proximity of a respective animal wearing a respective animal beacon to said feed bank;

when said received first signal comprising the strongest RSSI Value is greater than −68 dBm, determining that a respective animal wearing a respective animal beacon having the strongest RSSI value is a healthy animal; and identifying, by said at least one beacon reader, at least one morbid animal among the plurality of animals housed in the feedyard wherein the at least one morbid animal has lower than normal visits to the feed bunk based on the proximity history of the at least one morbid animal to the feed bunk;

wherein a portion of said pocket is coated with a material that blocks or absorbs electronic transmissions; and wherein:

said at least one beacon reader only receives signals from an animal beacon when an animal wearing an ear tag is facing said at least one beacon reader; and said at least one beacon reader does not receive signals from an animal beacon when an animal wearing an ear tag is facing away from said at least one beacon reader.

7. The method of claim 6, wherein each of the plurality of said animal beacons is configured to transmit said first signal on any of three different output frequencies.

8. The method of claim 6, wherein said at least one beacon reader comprises a first non-transitory computer readable medium, said method further comprising encoding in said first non-transitory computer readable medium said unique identifier in combination with said proximity history of each animal to said feed bunk.

9. The method of claim 8, further comprising: determining a date and time when said at least one beacon reader receives said first signal from each of the plurality of animal beacons; saving by said at least one beacon reader said date and time when said at least one beacon reader receives said first signal from each of the plurality of animal beacons.

10. The method of claim 9, further comprising:

transmitting by said from each of the plurality of animal beacons beacon reader to a remote data storage system said unique identifier, said date, and said time;

encoding in a non-transitory computer readable medium by said remote data storage system said unique identifier, said date, and said time from each of the plurality of animal beacons.

\* \* \* \* \*